July 31, 1934.  V. G. APPLE  1,968,592
CONTROL MECHANISM
Filed Jan. 23, 1930  2 Sheets-Sheet 2

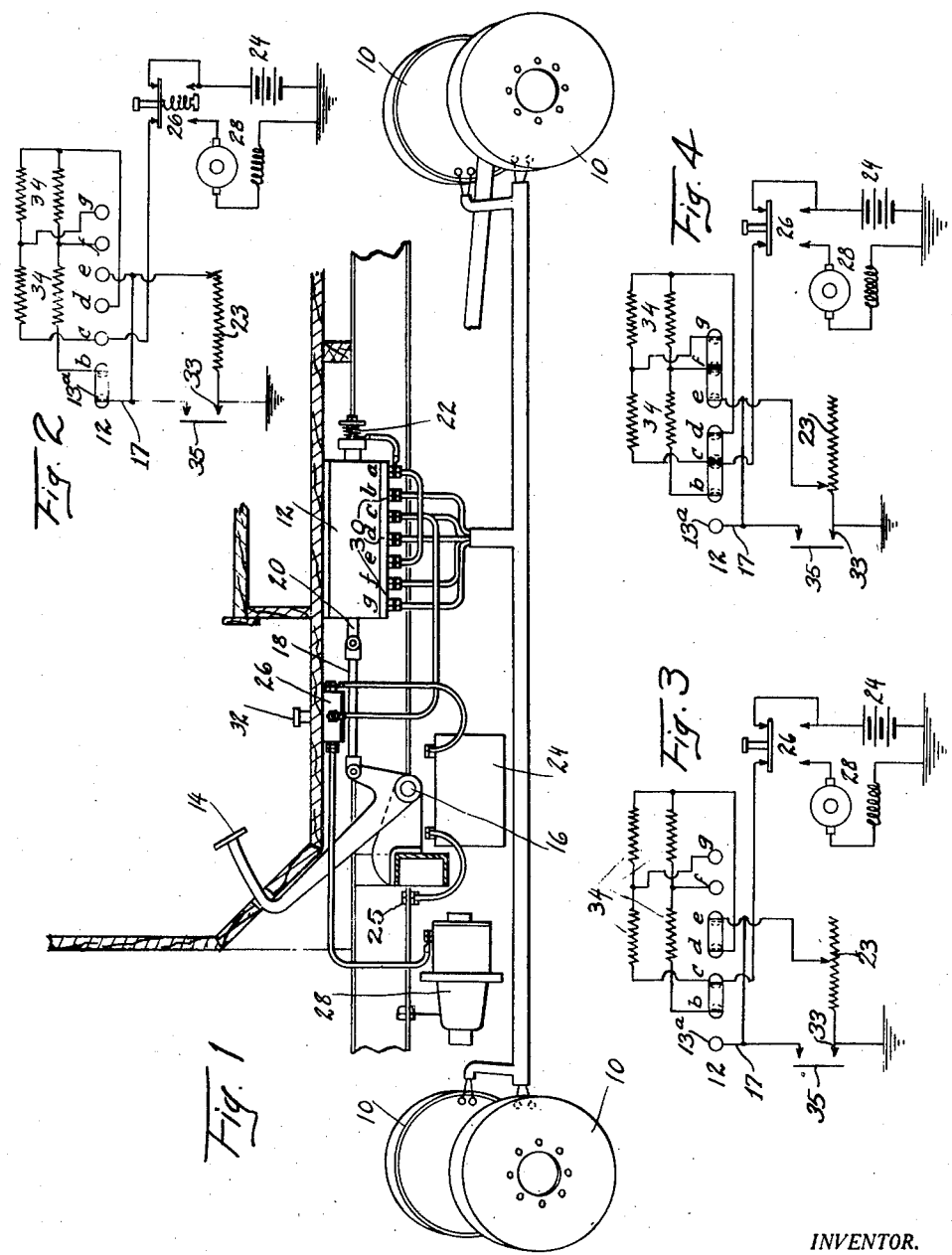

INVENTOR.
Vincent G. Apple
BY
ATTORNEYS

Patented July 31, 1934

1,968,592

UNITED STATES PATENT OFFICE 1,968,592

CONTROL MECHANISM

Vincent G. Apple, Dayton, Ohio, assignor to Bendix Brake Company, South Bend, Ind., a corporation of Illinois Application January 23, 1930, Serial No. 422,749

12 Claims. (Cl. 188—158)

My invention relates to vehicle control mechanism and has particular reference to control means for use in conjunction with a system of electric brakes wherein independently operable means are incorporated in the circuit for breaking the circuit and establishing another for the purpose of operating other electrical units.

An object of my invention is to so incorporate a switch which may be operated at any time to close a circuit through an electric starting motor in an electric brake circuit that the said brake circuit normally remains in closed position.

Still another object of my invention is to incorporate with the above combination of circuits means whereby the power transmitted to the electric brakes may be regulated in proportion to the depression of the conventional brake pedal.

An important feature is to provide, in a motor vehicle having starter mechanism including a control member and brake mechanism including a control member, means whereby the starter control member determines the functioning of the brake control member.

Figure 5:
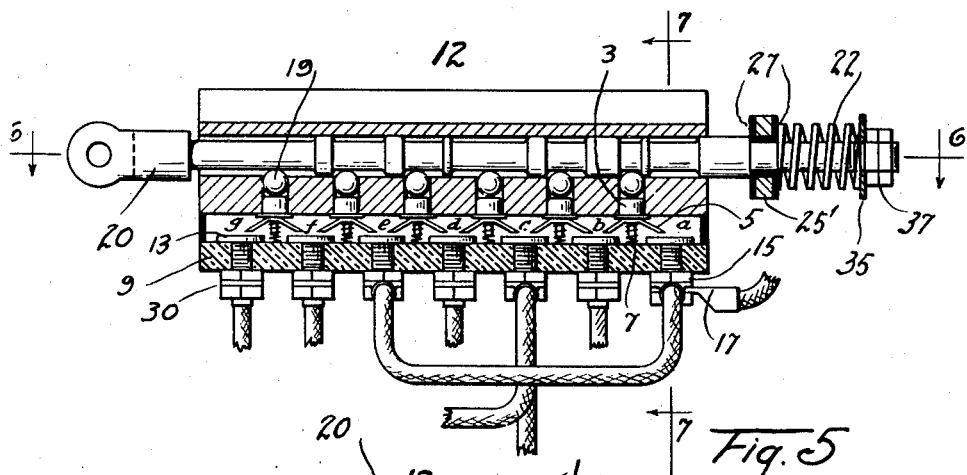

Still other objects and meritorious features of my invention will become apparent from the following description taken in conjunction with the drawings wherein like numerals refer to like parts throughout the several figures and wherein:

Fig. 1 represents a diagrammatic view of my circuit control system,

Figs. 2 to 4, inclusive, are circuit diagrams of electrical connections when the operating parts are in different positions, Fig. 5 is a longitudinal section through the cam rod, switch blades, terminals, et cetera, of the electric controller.

Figure 6:
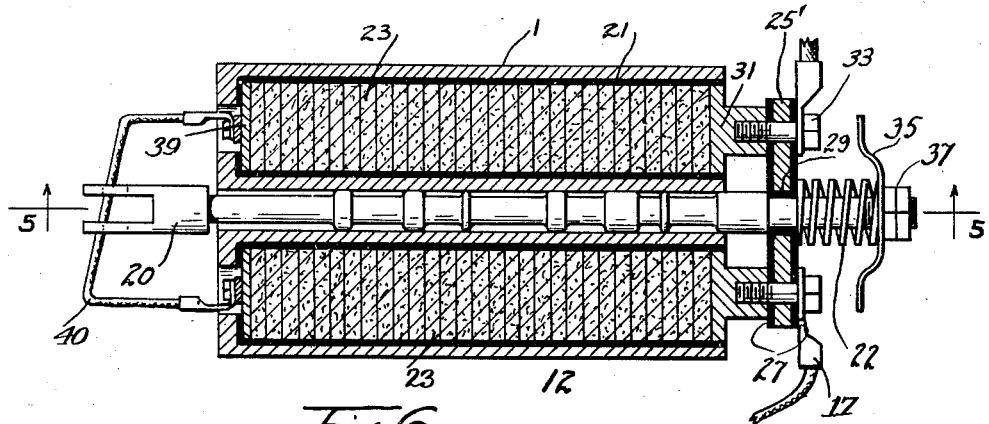
Figure 7:
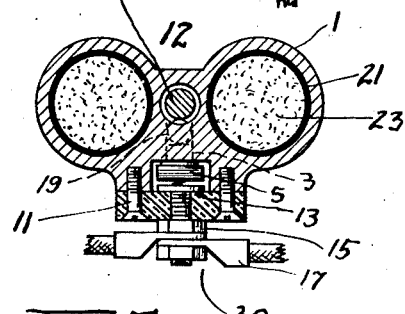

Fig. 6 is a partial section through the resistance elements and along the axis of the cam rod, and Fig. 7 is a cross section through terminal plate 13a.

In Fig. 1 I have illustrated a four wheel braking system somewhat broadly, each brake assembly being indicated by the numeral 10. I contemplate the use of an individual electric solenoid motor for the purpose of operating each of the brakes. Electric brake mechanism such as that disclosed in the patent to Noble, 1,729,841, October 1, 1929, may be satisfactorily utilized in conjunction with my improved control mechanism.

Secured to the chassis in any convenient fashion is an electric controller member 12 of variable resistance.

The conventional brake pedal 14 is pivoted on the rod 16 and is hooked up by means of the link 18 to the axially slidable cam rod 20 of my controller 12.

Pressure upon the brake pedal 14 functions to slide this cam rod 20 axially along the controller 12 against the resistance of the coil spring 22 which is seated against the other extremity of the cam rod 20 as indicated.

The controller 12 includes a housing 1, cam rod 20, and switch elements 3, 5, and 7. A plate 9 of insulating material is secured to housing 1 by screws 11. Terminals 30 include terminal plates 13 which screw into and through plate 9 and are clamped by nuts 15 which also secure terminal lugs 17. The terminal plates have been designated 13a—13g in the drawings to facilitate ready tracing of the various circuits. Balls 19 between cam rod 20 and switch stems 3 reduce friction in operation.

Tubes of insulating material 21 are pressed into housing 1 and contain a number of discs 23 of carbon or graphite or other suitable materials which act as resistance elements. A plate 25' insulated by plates 27 and bushing 29 from cam rod 20 connect to plungers 31 through bolts 33. A plate 35 conductively connected to cam rod 20 by nuts 37 holds spring 22 in place and acts as a short circuiting switch against bolts 33. Plates 39 act as contacts and bearings for discs 23. When the short circuiting switch 35 is open, the circuit is established from terminal 13a through 17 and into the carbon discs which are connected together by lead 40. Terminal 33 is grounded at any suitable place such as the frame of the vehicle.

Operation is substantially as follows:

Movement of cam rod 20 in a forwardly direction causes the cams to force balls 19 outwardly against switch stems 3 to bring switch blades 5 into contact with terminal plates 13. At the same time spring 22 is being compressed, which exerts pressure on plungers 31 and discs 23 and decreases the resistance between plungers 31 and plates 39. The movement of the cam rod 20 is thus utilized to actuate switches progressively while changing resistance through elements 23, thereby placing connected circuits in any desired relationship. A greater number of switches or resistance elements than shown can be used. When cam rod 20 has reached the limit of its forward travel, plate 35 comes in contact with bolts 33, short circuiting the resistance in discs 23 and allowing the maximum possible current to flow in connected circuit.

A storage battery 24 has one of its terminals grounded at some convenient portion of the frame as at 25, and its other terminal connected to one binding post of the electric starting switch 26. Another binding post of the starting switch is connected directly to the electric starting motor 28.

A third binding post on the starting switch 26 connects up with the controller member 12. The starter switch 26 is normally retained in position by means of a spring, or its equivalent, where the circuit from the battery 24 through the electric controller 12 and thence on to the brakes is in a position to be closed by depression of the brake pedal. Movement of the axial camming rod of my controller member is adapted to successively open and close various switch terminals, indicated broadly by the numeral 30 in Fig. 1, whereby the resistance elements contained in the brake solenoid coils 34 are connected up in various relationships of series and parallel. In this way as pedal 14 is depressed the resistance in the controller will be decreased and greater amperage will be permitted to flow to each of the electric brakes in the assembly 10.

As is apparent from the diagrammatic illustration of Fig. 1 and the circuit diagrams of Figs. 2–4, depression of the button 32 of the starter switch 26 will open the circuit through the controller member and electric brakes and close a circuit from the battery directly to the starting motor 28.

When the starting switch button is released and the brake pedal 14 slightly depressed, a circuit illustrated in Fig. 2 is established and the windings of the motors or solenoid coils indicated broadly in the circuit diagrams by the numeral 34 are in series with each other. On further depression of the brake pedal 14 the circuit through the brakes is shifted to that ilustrated in Fig. 3 wherein the coils or motors are in a series parallel arrangement. Further depression of the brake pedal 14 results in the circuit of Fig. 4. In this circuit the coils or motors of the brakes are all in parallel and the minimum resistance possible while still retaining the controller element in circuit, is produced.

On further depression of the brake pedal to its lowermost position all of the resistances are cut out of the circuit and the maximum amperage, or current strength, is permitted to flow from the storage battery 24 to each of the brakes or coils in the assemblies 10.

Having illustrated a preferred embodiment of my control system various modifications thereof may become apparent to those skilled in the art and for that reason I intend to limit myself only within the scope of the appended claims.

I claim:

1. Vehicle control mechanism comprising electric brakes, a brake pedal, means normally completing a circuit through said brakes on depression of the brake pedal, and an electric starting motor, a switch in said circuit adapted to normally remain in closed brake circuit position, but operable to open said brake circuit and close a circuit through the starting motor.

2. Vehicle control mechanism comprising electric brakes, a brake pedal, means normally closing an electric circuit through said brakes on depression of the brake pedal, a variable resistor element included in said circuit and operable to vary the resistance to the current flow in proportion to the depression of the brake pedal, an electric starting motor, a switch in said circuit adapted to normally remain in closed brake circuit position but operable to open said brake circuit and close a circuit through the starting motor.

3. Vehicle control mechanism comprising electric brakes, an electric starting motor, a brake pedal, means normally retaining said brake circuit in position to be automatically closed upon depression of the brake pedal, said means being independently operable to open said circuit and close a circuit through the electric starting motor.

4. Vehicle control mechanism comprising brakes, a brake pedal, an electric starting motor, a single source of electric power, means whereby depression of the brake pedal automatically causes transmission of power from the source to the brakes for actuating the same, and means normally permitting such transmission but independently operable to shift the same to the starting motor.

5. Vehicle control mechanism comprising brakes, a brake pedal, an electric starting motor, a single source of electric power, means whereby depression of the brake pedal automatically causes transmission of power from the source to the brakes in proportion to the pedal depression for actuating the same, and means normally permitting such transmission but independently operable to shift the same to the starting motor.

6. In a motor vehicle having, in combination, electric brake mechanism including a brake pedal operable to regulate the application of the brakes, electric starter mechanism including a starter pedal operable to control the starter, said starter pedal having a normally inoperative position at which the brake pedal is effective to regulate application of the brakes and a second and operative position at which the brake pedal is ineffective.

7. In a motor vehicle having, in combination, electric brake mechanism including power means to apply the brakes and a brake pedal to regulate the application, electric starter mechanism to start the engine including power means to actuate the starter and a starter pedal controlling its operation, said starter pedal operable in one position to render the brake pedal means ineffective.

8. In combination with a vehicle having brake mechanism associated with each wheel thereof, electric means associated with each brake for actuating the same including an electric coil, an electric starting motor, a source of electrical energy, a circuit including the electric motor and the energy source, a switch controlling said circuit and normally retained in one position to break the circuit, a second circuit including said energy source, electric brake actuating means and said switch and adapted to be maintained in closed condition when said switch is in its normally retained position, a brake pedal, and a plurality of contacts operable on depression of said pedal to vary the circuit through said brake actuating mechanism, the resulting circuits including the independent coils of each brake actuating mechanism in different arrangements of series and parallel.

9. In combination with a vehicle having brake mechanism associated with each wheel thereof, electric means associated with each brake for actuating the same, an electric starting motor, a source of electrical energy, a circuit including the electric motor and the energy source, a second circuit including said energy source and electric brake actuating means, a switch controlling both circuits normally retained in open circuit position as to the starting motor circuit and in closed circuit position as to the electric brake circuit, a brake pedal, and a plurality of contacts operable on depression of said pedal to vary the circuit through said brake actuating mechanism.

10. In combination with a vehicle having electric brake actuating mechanism and a brake pedal, a source of electrical energy, and an electric starting motor, an electric circuit including said brake actuating mechanism and means operable by said pedal for making and breaking said circuit, and a manually operable starter switch arranged to cut said brake actuating mechanism out of said circuit and cut said electric starting motor in circuit at will.

11. In a motor vehicle having, in combination, electric power brake mechanism including a control member manually operable to cause application of the brakes, electric starter mechanism including a control member manually operable to control the starter, and electric circuit breaking mechanism responsive to a given movement of said starter control member to break the circuit through the brakes at different stages of brake application.

12. In a motor vehicle having, in combination, brake mechanism including electric power means to apply the brakes and a control member manually operable to regulate their application by said power means, electric starter mechanism including a control member manually operable to regulate the same, and means responsive to a given movement of the starter control member to break the circuit through the brake applying electric power means.

VINCENT G. APPLE.